United States Patent
Sonderman et al.

(10) Patent No.: US 6,546,508 B1
(45) Date of Patent: *Apr. 8, 2003

(54) METHOD AND APPARATUS FOR FAULT DETECTION OF A PROCESSING TOOL IN AN ADVANCED PROCESS CONTROL (APC) FRAMEWORK

(75) Inventors: Thomas Sonderman, Austin, TX (US); Elfido Coss, Jr., Austin, TX (US); Qingsu Wang, Austin, TX (US)

(73) Assignee: Advanced Micro Devices, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,476

(22) Filed: Oct. 29, 1999

(51) Int. Cl.[7] ............................................. G06F 11/00
(52) U.S. Cl. ......................... 714/48; 710/108; 710/109; 710/110; 710/121
(58) Field of Search ............................ 714/48; 710/108, 710/109, 110, 121

(56) References Cited

U.S. PATENT DOCUMENTS

| | | | |
|---|---|---|---|
| 5,105,362 A * | 4/1992 | Kotani ........................ | 700/108 |
| 5,787,190 A | 7/1998 | Peng et al. ................. | 382/145 |
| 5,859,964 A * | 1/1999 | Wang et al. ................. | 714/48 |
| 5,864,773 A | 1/1999 | Barna et al. ................. | 702/85 |
| 5,896,294 A | 4/1999 | Chow et al. ........... | 364/468.28 |
| 5,939,886 A | 8/1999 | Turner et al. ............... | 324/464 |
| 5,963,884 A | 10/1999 | Billington et al. ............ | 702/56 |
| 6,061,640 A * | 5/2000 | Tanaka et al. ............... | 700/108 |
| 6,065,128 A | 5/2000 | Harvey ........................ | 713/500 |
| 6,070,196 A | 5/2000 | Mullen, Jr. .................. | 709/250 |
| 6,097,887 A | 8/2000 | Hardikar et al. ............ | 395/701 |
| 6,115,643 A * | 9/2000 | Stine et al. .................. | 700/108 |
| 6,130,414 A | 10/2000 | Toprac ........................ | 219/497 |
| 6,263,255 B1 * | 7/2001 | Tan et al. .................... | 700/106 |
| 6,314,328 B1 * | 11/2001 | Powell ........................ | 700/109 |
| 6,314,385 B1 * | 11/2001 | Kim et al. ................... | 700/108 |
| 6,336,055 B1 * | 1/2002 | Cho ............................ | 700/109 |
| 2002/0062162 A1 * | 5/2002 | Bunkofske et al. ......... | 700/108 |

* cited by examiner

*Primary Examiner*—Robert Beausoliel
*Assistant Examiner*—Marc Duncan
(74) *Attorney, Agent, or Firm*—Williams, Morgan & Amerson

(57) ABSTRACT

A method and apparatus for providing fault detection in an Advanced Process Control (APC) framework. A first interface receives operational state data of a processing tool related to the manufacture of a processing piece. The state data is sent from the first interface to a fault detection unit. A fault detection unit determines if a fault condition exists with the processing tool based upon the state data. A predetermined action is performed on the processing tool in response to the presence of a fault condition. In accordance with one embodiment, the predetermined action is to shutdown the processing tool so as to prevent further production of faulty wafers.

23 Claims, 5 Drawing Sheets

METHOD AND APPARATUS FOR FAULT DETECTION OF A PROCESSING TOOL IN AN ADVANCED PROCESS CONTROL (APC) FRAMEWORK

BACKGROUND OF THE INVENTION

1. Field of the Invention

This invention relates generally to semiconductor fabrication technology, and, more particularly, to a method and apparatus for fault detection in an Advanced Process Control (APC) framework.

2. Description of the Related Art

There is a constant drive in the semiconductor industry to increase the quality, reliability, and throughput of integrated circuit devices such as microprocessors, memory devices and the like. This drive is fueled by consumer demands for higher quality computers and electronic devices that operate more reliably.

These demands by the consumer have resulted in some improvements in the manufacture of semiconductor devices as well as in the manufacture of integrated circuit devices incorporating such semiconductor devices. Reducing defects in the manufacture of these devices lowers the cost of the devices themselves. Accordingly, the cost of the final product incorporating these devices is also reduced, thus providing inherent monetary benefits to both the consumer and manufacturer.

Although there has been an improvement in detecting faults associated with semiconductor manufacturing processes, one problem currently encountered by the semiconductor manufacturing industry is the delay in reporting these faults such that corrective measures can be implemented in a more expedient manner. As a result of this delay, several faulty devices are produced, which undesirably increases costs for the manufacturer and consumer.

The present invention is directed to overcoming, or at least reducing the effects of, one or more of the problems set forth above.

SUMMARY OF THE INVENTION

In one aspect of the present invention, a method is provided for fault detection in a manufacturing process. The method includes receiving at a first interface operational state data of a processing tool related to the manufacture of a processing piece, and sending the state data from the first interface to a fault detection unit. The method further includes determining if a fault condition exists with the processing tool based upon the state data, and performing a predetermined action on the processing tool in response to the presence of a fault condition.

In another aspect of the present invention, a system is provided for fault detection in a manufacturing process. The system includes a processing tool adapted to manufacture a processing piece. A first interface is provided, which is coupled to the processing tool, and adapted to receive operational state data of the processing tool related to the manufacture of the processing piece. The system further includes a fault detection unit adapted to determine if a fault condition exists with the processing tool based on said operational state data. A framework is also provided, and adapted to receive the state data from the first interface, and to send the data to the fault detection unit, and to perform a predetermined action on the processing tool in response to the presence of a fault condition.

BRIEF DESCRIPTION OF THE DRAWINGS

The invention may be understood by reference to the following description taken in conjunction with the accompanying drawings, in which like reference numerals identify like elements, and in which.

Figure 1:
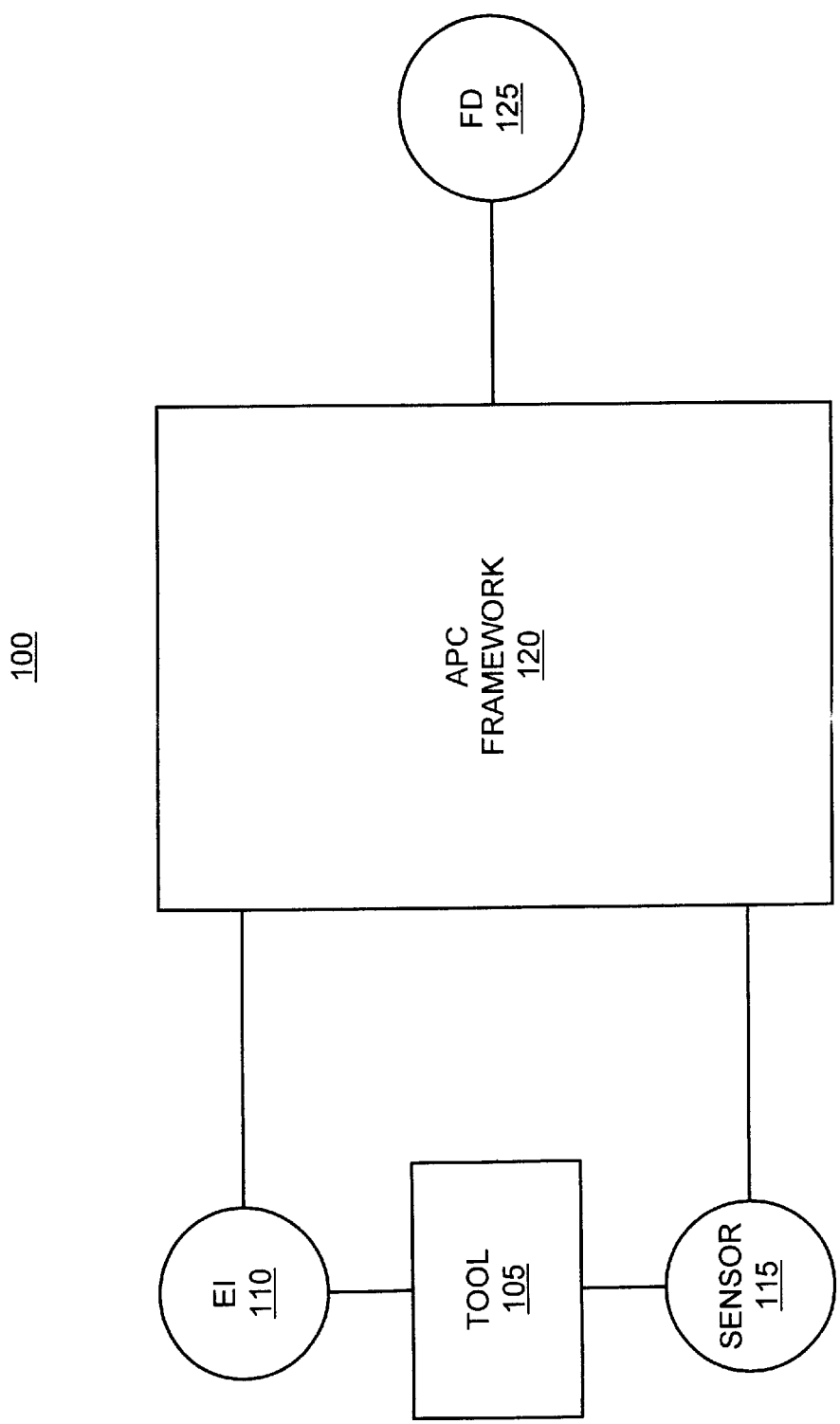
FIG. 1 illustrates a manufacturing system, including an APC framework, for providing fault detection of a processing tool in accordance with one embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a system 100 for determining fault detection in a semiconductor fabrication process based upon processing tool operational state data is provided. The system 100 includes a processing tool 105, which in the illustrated embodiment, is in the form of semiconductor fabrication equipment used to produce a processing piece, such as a silicon wafer. The processing tool 105, in accordance with one embodiment, may be an exposure tool, commonly known as a "stepper." It will be appreciated, however, that the processing tool 105 need not necessarily be limited to a stepper, or even to a tool for producing silicon wafers, but could include other types of manufacturing equipment for producing a variety of different types of commercial products without departing from the spirit and scope of the present invention.

The processing tool 105 is coupled to an equipment interface (EI) 110, which retrieves various tool state data from the tool 105, and communicates this data to an Advanced Process Control (APC) framework 120 to determine whether the tool 105 is experiencing a faulty operation. The tool state data may include, but is not necessarily limited to, temperature, pressure, and gas flow measurements from the processing tool 105. The equipment interface 110 further may receive signals from the APC framework 120 that may be used to take corrective action if the tool state data indicates a faulty operation of the tool 105.

An add-on sensor 115 may also be coupled to the processing tool 105 to measure additional tool state data that is not ascertained by the tool 105 itself. For example, the add-on sensor 115 could be used to determine whether the silicon wafer was produced within acceptable operational limits by the tool 105. Such acceptable operational limits of the tool 105 may be to produce the wafer within a certain temperature range, for example. It will be appreciated, however, that the add-on sensor 115 may be used to record various other operational state parameters, and, thus, need not be limited to the aforementioned example.

The sensor 115 may be embodied as a simple data acquisition program, such as a C++ standalone program acquiring data from a thermocouple wire, for example. Alternatively, the sensor 115 may be embodied as a full-fledged LABVIEW® application, acquiring data through multiple transducers (not shown). It will further be appreciated that the sensor 115 need not be used at all, and the APC framework 120 could rely solely upon the tool state data forwarded from the equipment interface 110. If used, however, the sensor 115 forwards the additional tool state data to the APC framework 120 for analysis.

The tool state data is received by the equipment interface 110 as the data is sent from the processing tool 105 and the sensor 115, if used. The equipment interface 110, subsequent to receiving the data, forwards the tool state data to the APC framework 120 for fault detection analysis.

A fault detection (FD) unit 125, which couples to the APC framework 120, receives the state data of the tool 105 from the equipment interface 110 and sensor 115 via the APC framework 120. Prior to sending the data to the fault detection unit 125, the APC framework 120 translates the tool state data to a format that is recognizable to the fault detection unit 125 in a manner that is well known to those of ordinary skill in the art. In accordance with one embodiment, the fault detection unit 125 includes a commercially available software package, such as ModelWare®, for example, that provides fault detection analysis of the processing tool 105. It will be appreciated, however, that other types of commercially available fault detection software could also be used in lieu thereof without departing from the spirit and scope of the present invention.

The fault detection unit 125 compares the received tool state data from the APC framework 120 to fault model data. The fault model data includes tool state data of other similar-type tools, where it was previously known that such tools have operated within acceptable operational limits. The types of faults that could be detected by the fault detection unit 125 include processing and/or operational faults in silicon wafer fabrication. Examples of processing faults may include, but are not necessarily limited to, non-optimal preheating of the chamber, catastrophic failure where a broken wafer is detected, abnormal N2 flow rate, temperature overshoots at the top of a ramp, tube temperature measurement drifts, etc. Some examples of operational faults detected by the fault detection unit 125 may include interrupted/resumed processing, no wafer sleuth or improper wafer sleuth prior to Rapid Thermal Anneal (RTA), etc.

The fault detection unit 125, upon evaluating the tool state data sent from the APC framework 120, sends the results of potential faults and/or proper operation of the tool 105 to the APC framework 120. The APC framework 120, in turn, may send control signals to the equipment interface 110 to control the processing tool 105 based upon the results forwarded from the fault detection unit 125. For example, the signal sent from the APC framework 120 may be to shut down the tool 105 to prevent any additional faulty production of wafers (providing this was determined by the fault detection unit 125). Data could also be sent from the APC framework 120 to inform a technician on how to rectify a faulty condition of the tool 105, if so desired.

Figure 2:
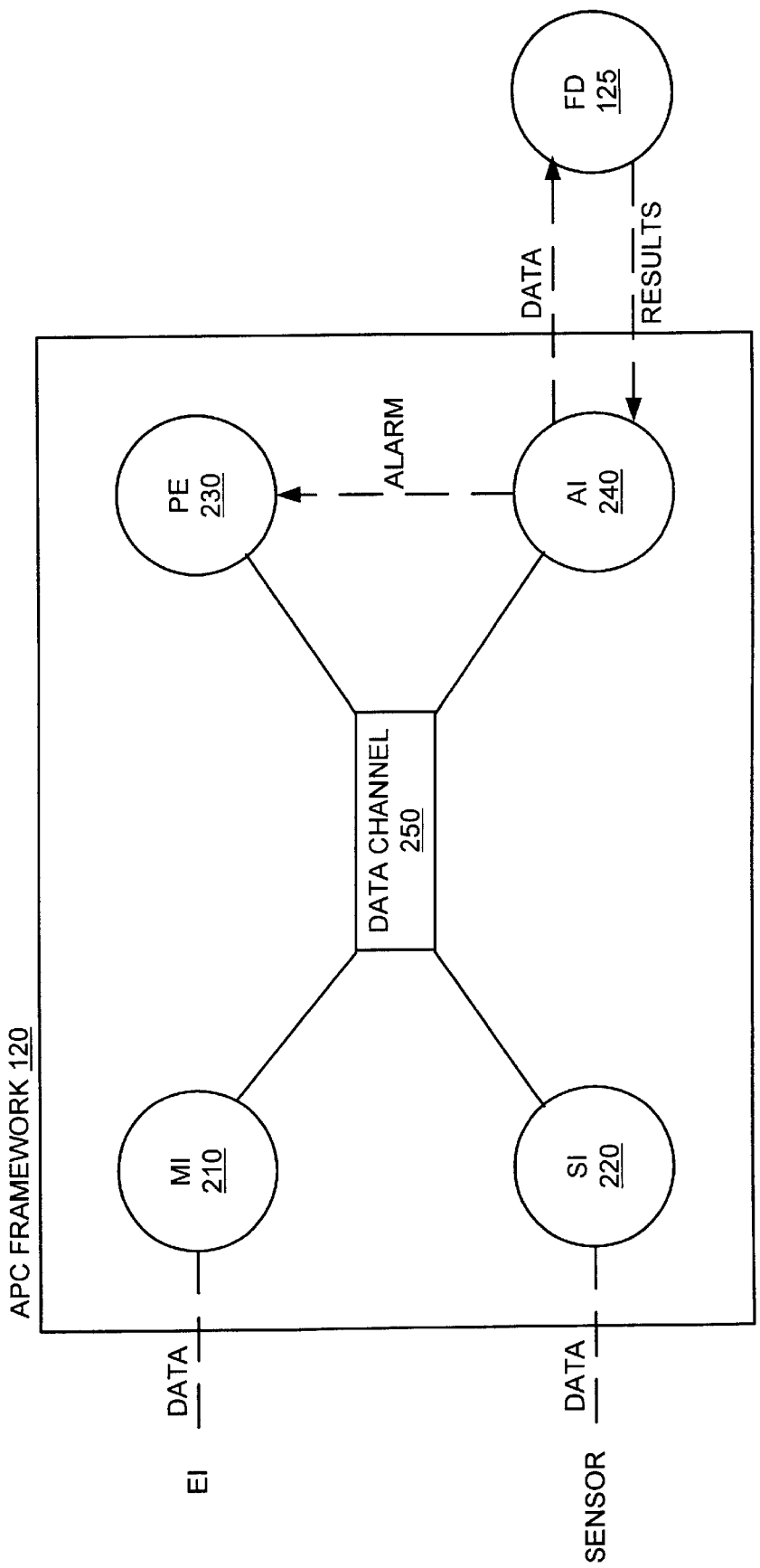
FIG. 2 depicts the detail of the APC framework of FIG. 1.

Turning now to FIG. 2, a more detailed representation of the APC framework 120 is provided. The APC framework 120 is a component-based architecture comprised of interchangeable, standardized software components enabling run-to-run control and fault detection of the processing tool 105. The APC framework 120 includes a machine interface (MI) 210 for interfacing the tool 105 to the framework 120 to collect the tool state data therefrom. The APC framework 120 further includes a sensor interface (SI) 220 for interfacing the add-on sensor 115 with the framework 120. The sensor interface 220 also collects the tool state data of the processing tool 105 through the sensor 115. Although only one sensor interface 220 is provided, it will be appreciated that several sensor interfaces may be included without departing from the spirit and scope of the present invention. A plan executor (PE) 230 (i.e., a process controller) manages the APC framework 120 and provides possible solutions to problems found with the tool state data that was determined by the fault detection unit 125. The framework 120 further includes an applications interface (AI) 240 for interfacing with third-party applications that run on the fault detection unit 125 to analyze the tool state data received via the machine and sensor interfaces 210, 220. In the illustrated embodiment, the third-party application is the fault detection unit 125. A data channel 250 is further provided to allow for communication between the machine and sensor interfaces 210, 220, the plan executor 230, and the applications interface 240 of the APC framework 120.

The machine interface 210 couples to the equipment interface 110 to serve as an interface between the processing tool 105 and the APC framework 120. The machine interface 210 supports the setup, activation, monitoring, and data collection of the tool 105. It receives commands, status events, and collected data from the equipment interface 110 and forwards this information to other components of the APC framework 120, namely the plan executor 230 and applications interface 240. Any responses that are received by the machine interface 210 from the other components of the APC framework 120 are routed to the equipment interface 110 for delivery to the processing tool 105. As previously discussed, this may include a signal from the plan executor 230 to manipulate the tool 105 if a faulty condition is detected.

The machine interface 210 also reformats and restructures the messages between the specific communications protocol utilized by the equipment interface 110 and the Common Object Request Broker Architecture Interface Definition Language (CORBA IDL) communications protocol used by the components of the APC framework 120. The manner in which the machine interface 210 performs such translation between the equipment interface-specific communications protocol and the CORBA IDL protocol of the APC framework 120 is well known to those of ordinary skill in the art. Accordingly, the specific translation process between these two formats will not be discussed herein to avoid unnecessarily obscuring the present invention.

The sensor interface 220 serves as an interface between the add-on sensor 115 and the APC framework 120. The sensor interface 220 provides setup, activation, monitoring, and data collection for the add-on sensor 115. Similar to the machine interface 210, the sensor interface 220 also reformats and restructures the messages between the specific communications protocol utilized by the sensor 115 and the CORBA IDL protocol used by the components of the APC framework 120.

The applications interface 240 supports the integration of third-party tools (e.g., commercial software packages, such as ModelWare, MatLab, and Mathematica, for example) to the APC framework 120. Typically, these third-party tools do not provide the standard CORBA IDL protocol known to the APC framework 120. Accordingly, the applications interface 240 provides the necessary translation between the communications protocol utilized by the third-party tool and the CORBA protocol used by the APC framework 120.

In the illustrated embodiment, the third-party tool is the fault detection unit 125 for analyzing the tool state data of the processing tool 105 that is supplied via the machine interface 210 and the sensor interface 220. In one embodiment, the fault detection unit 125 includes Model-Ware® software for providing fault detection; however, it will be appreciated that other commercially available fault detection software could also be used without departing from the spirit and scope of the present invention.

The plan executor 230 performs control functions based upon the results determined by the fault detection unit 125. When the applications interface 240 receives the results from the fault detection unit 125, it forwards a copy of the results (usually in the form of an alarm signal) to the plan executor 230. Upon inspection of the results, the plan executor 230 attempts to rectify any fault conditions found with the tool 105. In accordance with one embodiment of the present invention, the solution to a fault condition may be for the plan executor 230 to send a control signal to the machine interface 210 to shut down the tool 105 so as to prevent further manufacturing of faulty silicon wafers. The plan executor 230, in addition to shutting down the tool 105, may also apprise a technician of any potential solutions to rectify the fault condition through an operator interface (not shown), for example, before the tool 105 may commence operation once again.

In accordance with the present invention, the equipment interface 110 receives the tool state data from the processing tool 105, and then forwards this data to the machine interface 210. The sensor 115 also receives tool state data and forwards the data to the sensor interface 220. The machine interface 210, after receiving the tool state data, forwards the data to the plan executor 230 through the data channel 250. The sensor interface 220 also sends the tool state data it receives to the plan executor 230. The plan executor 230 then buffers the received tool state data until the occurrence of a predetermined event. The predetermined event, in accordance with one embodiment, may include the completion of processing of a lot (or batch) of wafers by the tool 105, for example. It will be appreciated, however, that the predetermined event need not be limited to this particular example, but could include the occurrence of other events as well. When the batch is complete, the plan executor 230 sends the accumulated tool state data of the processing tool 105 to the applications interface 240, which then sends the data to the fault detection unit 125.

The fault detection unit 125 subsequently analyzes the received data by comparing the tool state data of the processing tool 105 to a fault model, which contains tool state data from tools that have operated within acceptable limits. Subsequent to comparing the data and detecting any fault conditions that may exist in the manufacturing process, the fault detection unit 125 sends the results back to the applications interface 240, which then forwards the results to the plan executor 230 for appropriate action. In accordance with one embodiment, the tool 105 may be shut down if the tool state data was deemed unacceptable by the fault detection unit 125.

Figure 3A:
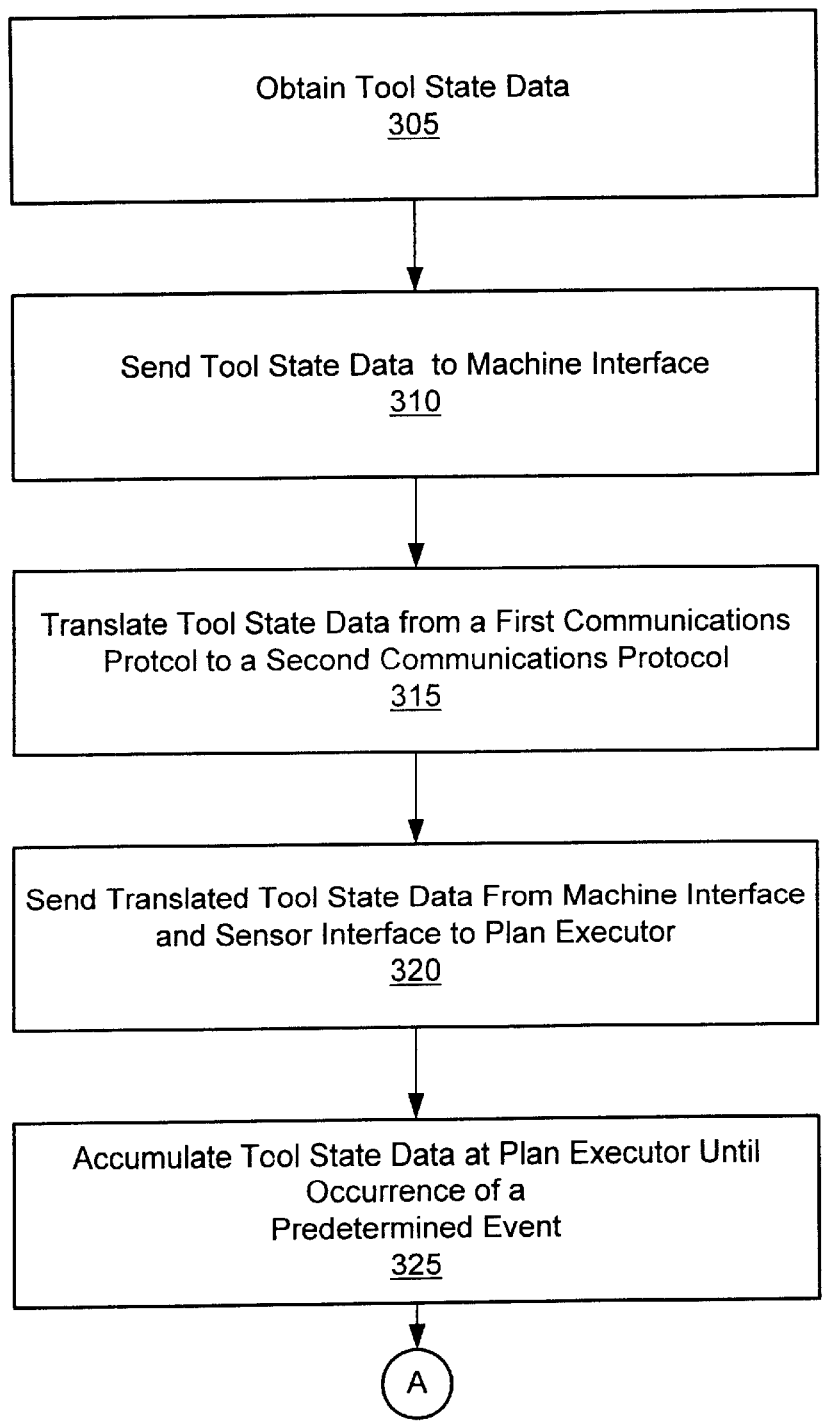
FIGS. 3A–C show a process for providing fault detection capability for the manufacturing system of FIG. 1.
Figure 3B:
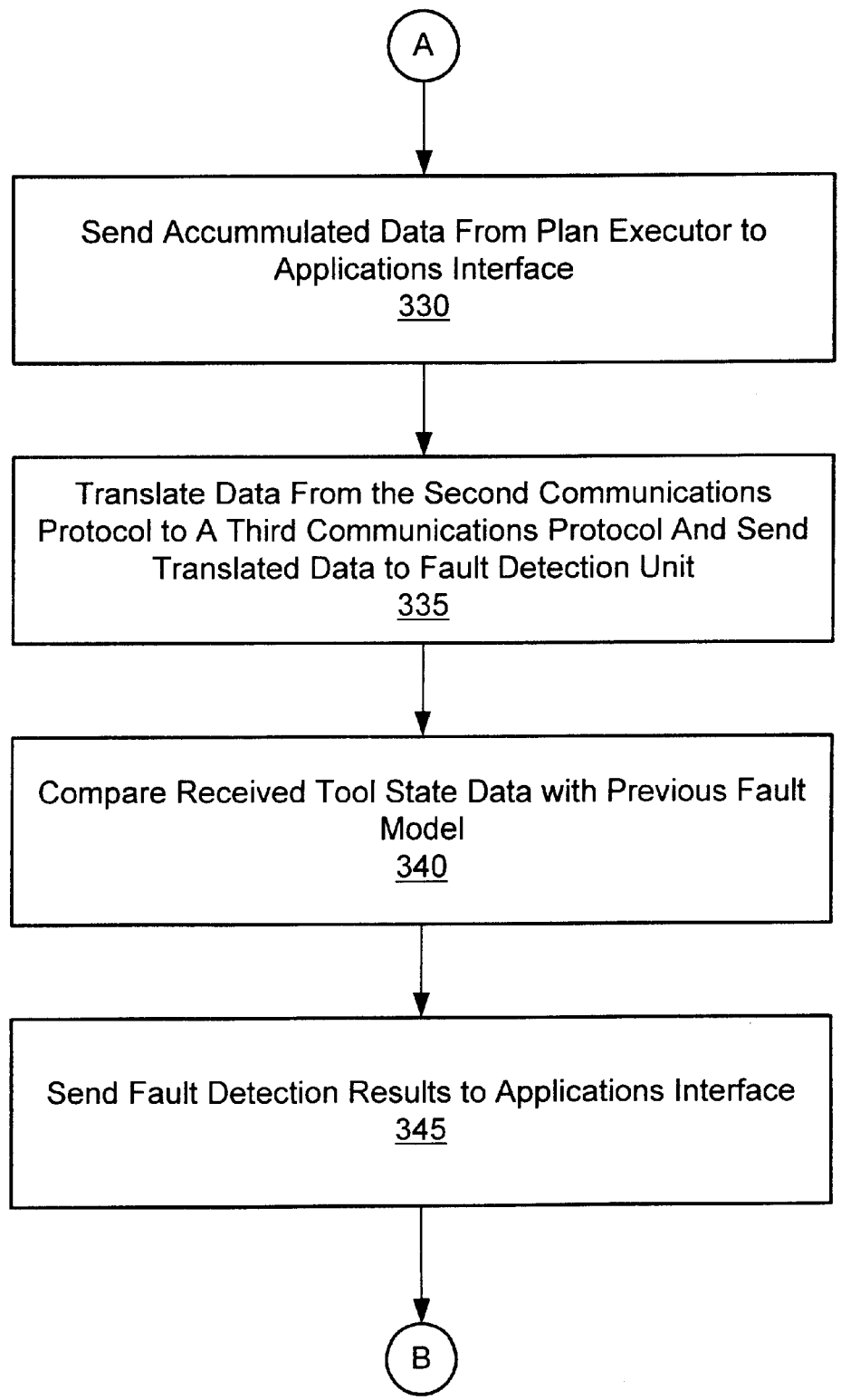
Figure 3C:
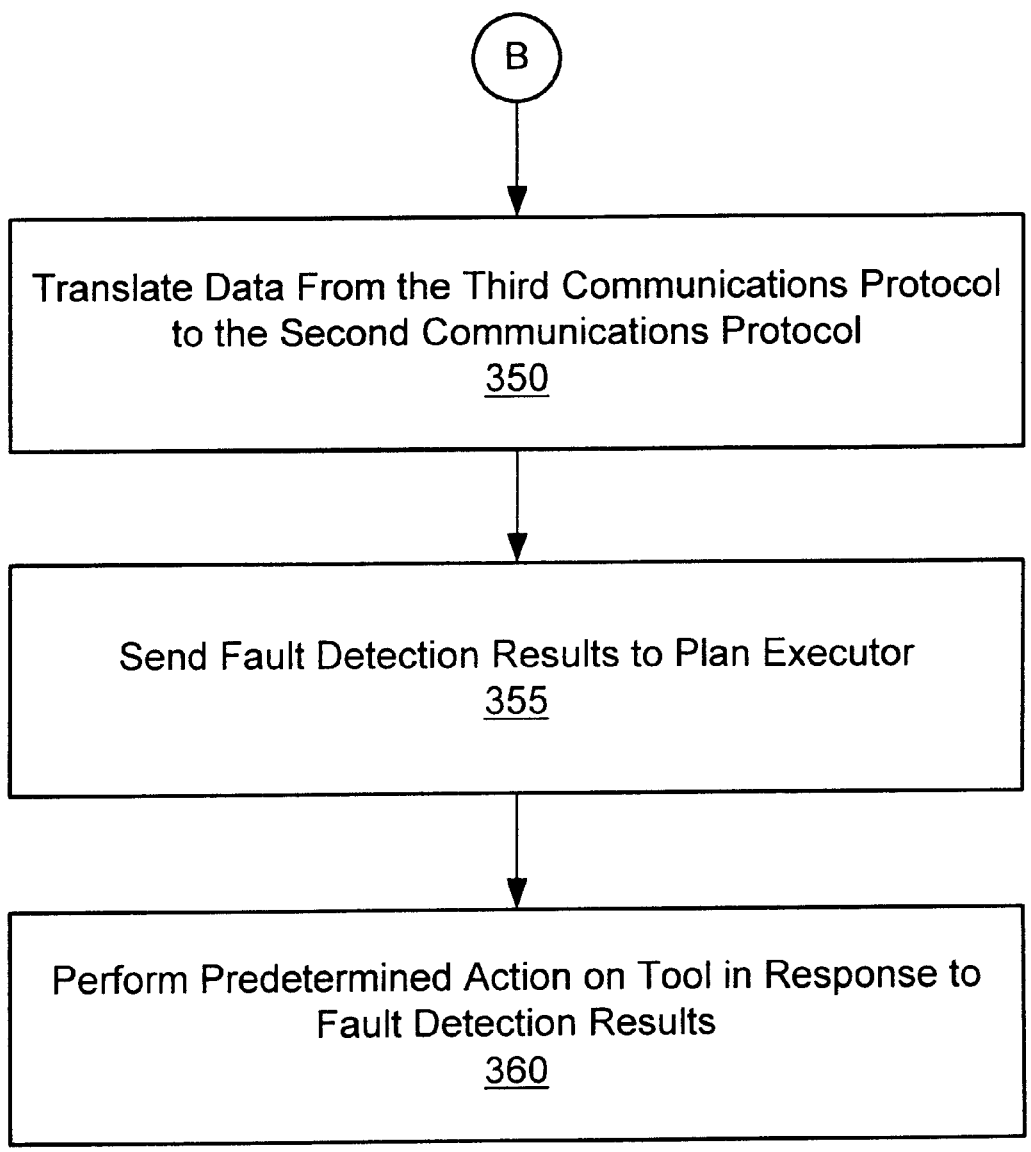

Turning now to FIGS. 3A–C, a process 300 for fault detection based upon tool state operational parameters in the APC framework 120 is provided. The process commences at block 305, where the tool state data of the processing tool 105 is obtained. The tool state data may include temperature, pressure, and gas flow measurements from the processing tool 105.

Once the tool state data is obtained by the equipment interface 110, the data is sent to the machine interface 210 at block 310. At block 315, the machine interface 210 translates the tool state data into a format that is recognizable to the plan executor 230 and the applications interface 240 of the APC framework 120 in a manner well known to those skilled in the art. In accordance with one embodiment, the translation involves the reformatting and restructuring of the messages between the specific communications protocol used by the equipment interface 110 and the CORBA IDL protocol used by the APC framework 120. The machine interface 210, upon translating the tool state data to the CORBA IDL standard, sends the data to the plan executor 230 at block 320. The sensor interface 220 also translates the tool state data it receives from the sensor 115 to the CORBA IDL standard, and sends this data to the plan executor 230 at block 320.

The plan executor 230 accumulates the tool state data from the machine interface 210 and sensor interface 220 until the occurrence of a predetermined event at block 325. The predetermined event, in accordance with one embodiment, may be the completion of a particular lot of wafers by the processing tool 105. It will be appreciated, however, that the predetermined event need not necessarily be defined by the completion of a lot of wafers, but could include other events as well.

The tool state data that is accumulated at the plan executor 230 is sent to the applications interface 240 upon occurrence of the predetermined event at block 330, which in the illustrated embodiment, is the completion of a lot of wafers by the processing tool 105. The applications interface 240 translates the tool state data from the CORBA IDL communications protocol utilized by the APC framework 120 to a protocol used by the fault detection unit 125, and subsequently sends the data to the fault detection unit 125 at block 335. As previously discussed, the manner in which the applications interface 240 translates the data into the proper communications protocol is well known to those of ordinary skill in the art, and will differ depending on the particular type of fault detection software used. The fault detection unit 125, after receiving the tool state data from the applications interface 240, compares the data to a fault model at block 340. As mentioned, the fault model includes tool state data from other similar-type tools in which it was previously known that such tools manufactured silicon wafers within acceptable operational limits.

Subsequent to comparing the tool state data of the tool 105 to the fault model, the fault detection unit 125 sends the results of the comparison to the applications interface 240 at block 345. The applications interface 240 then subsequently translates the received results from the fault detection unit 125 into the CORBA IDL protocol used by the APC framework 120 at block 350. The applications interface 240 then forwards the results to the plan executor 230 at block 355, which is typically done in the form of an alarm signal. That is, an alarm signal is generated if a fault in the manufacturing process was determined from the tool state data. The plan executor 230, after receiving the alarm signal from the application interface 240, determines whether to perform a predetermined action on the processing tool 105 based upon the results from the fault detection unit 125 at block 360. In accordance with one embodiment, the plan executor 230 may send a control signal to the equipment interface 110 to shut down the tool 105 so as to prevent the further production of faulty wafers by the tool 105.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   receiving at a first interface operational state data of a processing tool related to the manufacture of a processing piece;
   sending the state data from the first interface to a fault detection unit;
   determining if a fault condition exists with the processing tool based upon the state data; and
   shutting down the processing tool providing that the fault condition exists.

2. The method of claim 1, wherein sending the state data from the first interface to a fault detection unit further comprises:
   sending the state data from the first interface to a controller;
   accumulating the state data at the controller; and
   sending the accumulated state data from the controller to the fault detection unit upon occurrence of a predetermined event.

3. The method of claim 2, further comprising:
   sending an alarm signal indicative of the fault condition to the controller from the fault detection unit providing that a fault condition of the processing tool was determined by the fault detection unit.

4. The method of claim 2, further comprising:
   receiving the state data at a second interface from the first interface prior to sending the state data to the controller.

5. The method of claim 2, wherein determining if a fault condition exists, further comprises:
   comparing the state data received at the controller to predetermined state data at the fault detection unit.

6. A method, comprising:
   receiving at a first interface operational state data of a processing tool related to the manufacture of a processing piece;
   sending the state data to a second interface from the first interface;
   translating the state data at the second interface from a first communications protocol used by the first interface to a second communications protocol used by a controller;
   sending the state data from the second interface to the controller;
   accumulating the state data at the controller;
   sending the accumulated state data from the controller to a fault detection unit upon occurrence of a predetermined event;
   determining if a fault condition exists with the processing tool based upon the state data; and
   performing a predetermined action on the processing tool in response to the presence of a fault condition.

7. A method, comprising:
   receiving at a first interface operational state data of a processing tool related to the manufacture of a processing piece;
   sending the state data from the first interface to a controller, the state data being received at a second interface from the first interface prior to sending the state data to the controller;
   accumulating the state data at the controller;
   sending the accumulated state data from the controller to a fault detection unit upon occurrence of a predetermined event, the state data being received at a third interface from the controller prior to sending the state data to the fault detection unit;
   determining if a fault condition exists with the processing tool based upon the state data; and
   performing a predetermined action on the processing tool in response to the presence of a fault condition.

8. The method of claim 7, further comprising:
   translating the state data at the third interface from the second communications protocol used by the controller to a third communications protocol used by the fault detection unit.

9. A method, comprising:
   receiving at a first interface operational state data of a processing tool related to the manufacture of a processing piece;
   receiving additional state data of the processing tool from a sensor that is coupled to the processing tool at a second interface;
   sending the state data from the first interface to a controller;
   sending the additional state data to the controller as it is received at the second interface;
   accumulating the state data and the additional state data at the controller;
   sending the accumulated state data from the controller to a fault detection unit upon occurrence of a predetermined event;
   determining if a fault condition exists with the processing tool based upon the accumulated state data; and
   performing a predetermined action on the processing tool in response to the presence of a fault condition.

10. The method of claim 9, further comprising:
    translating the state data at the second interface from a first communications protocol used by the sensor to a second communications protocol used by the controller.

11. A method, comprising:
    receiving at a first interface operational state data of a processing tool related to the manufacture of a processing piece;
    sending the state data from the first interface to a controller;
    accumulating the state data at the controller;

sending the accumulated state data from the controller to a fault detection unit upon completion of a lot of processing pieces processed by the tool;

determining if a fault condition exists with the processing tool based upon the state data; and performing a predetermined action on the processing tool in response to the presence of a fault condition.

12. A system, comprising:

a processing tool adapted to manufacture a processing piece;

a first interface, coupled to the processing tool, the first interface adapted to receive operational state data of the processing tool related to the manufacture of the processing piece;

a fault detection unit adapted to determine if a fault condition exists with the processing tool based on said operational state data; and a framework adapted to receive the state data from the first interface, to send the data to the fault detection unit, and to perform a predetermined action on the processing tool in response to the presence of a fault condition; and wherein the framework includes:

a controller adapted to receive and accumulate the state data as the data is received by the first interface, and to send the state data to the fault detection unit upon occurrence of a predetermined event; and a second interface, coupled between the first interface and the controller, the second interface adapted to receive the state data from the first interface, and to translate the state data between a first communications protocol used by the first interface and a second communications protocol used by the framework.

13. The system of claim 12, wherein the second interface is further adapted to send the translated state data to the controller.

14. The system of claim 12, wherein the framework further includes:

a third interface, coupled between the controller and the fault detection unit, and adapted to receive the state data from the controller prior to sending the data to the fault detection unit.

15. The system of claim 14, wherein the third interface is further adapted to translate the state data from the second communications protocol used by the framework to a third communications protocol used by the fault detection unit.

16. The system of claim 15, wherein the framework is an Advanced Process Control (APC) framework, and the second communications protocol used by the framework is a Common Object Request Broker Architecture Interface Definition Language (CORBA IDL).

17. The system of claim 14, wherein the third interface is further adapted to send an alarm signal to the controller providing that a fault condition was determined by the fault detection unit.

18. The system of claim 17, wherein the controller is further adapted to send a control signal to the first interface reflective of the predetermined action providing that a fault condition exists.

19. The system of claim 18, wherein the predetermined action is to shut down the processing tool.

20. The system of claim 12, wherein the fault detection unit is further adapted to compare the state data of the processing tool and processing piece to predetermined state data to determine the presence of the fault condition.

21. The system of claim 12, wherein the processing tool is a semiconductor fabrication tool, and the processing piece is a silicon wafer.

22. A system, comprising:

a processing tool adapted to manufacture a processing piece;

a first interface, coupled to the processing tool, the first interface adapted to receive operational state data of the processing tool related to the manufacture of the processing piece;

a fault detection unit adapted to determine if a fault condition exists with the processing tool based on said operational state data;

a framework adapted to receive the state data from the first interface, to send the data to the fault detection unit, and to perform a predetermined action on the processing tool in response to the presence of a fault condition;

a sensor, coupled to the processing tool, the sensor adapted to receive additional state data from the processing tool; and wherein the framework includes:

a controller adapted to receive and accumulate the state data and the additional state data as it is received by the first interface, and to send the accumulated state data to the fault detection unit upon occurrence of a predetermined event; and a second interface, coupled between the sensor and the controller, the second interface adapted to receive the additional state data from the sensor, and to translate the additional state data between a first communications protocol used by the sensor and a second communications protocol used by the framework.

23. A system, comprising:

a processing tool adapted to manufacture a processing piece;

a first interface, coupled to the processing tool, the first interface adapted to receive operational state data of the processing tool related to the manufacture of the processing piece;

a fault detection unit adapted to determine if a fault condition exists with the processing tool based on said operational state data; and an advanced process control (APC) framework adapted to receive the state data from the first interface, to send the data to the fault detection unit, and to perform a predetermined action on the processing tool in response to the presence of a fault condition.

* * * * *